United States Patent
Zook et al.

(10) Patent No.: US 10,174,781 B2
(45) Date of Patent: Jan. 8, 2019

(54) LIGHT WEIGHT SEAL CAP

(71) Applicant: 3M INNOVATIVE PROPERTIES COMPANY, St. Paul, MN (US)

(72) Inventors: Jonathan D. Zook, Baytown Township, MN (US); Larry S. Hebert, Hudson, WI (US); Michael D. Swan, Lake Elmo, MN (US); Sheng Ye, Woodbury, MN (US); Susan E. DeMoss, Stillwater, MN (US); Robin E. Wright, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 245 days.

(21) Appl. No.: 14/783,916

(22) PCT Filed: Apr. 15, 2014

(86) PCT No.: PCT/US2014/034073
§ 371 (c)(1),
(2) Date: Oct. 12, 2015

(87) PCT Pub. No.: WO2014/172305
PCT Pub. Date: Oct. 23, 2014

(65) Prior Publication Data
US 2016/0069378 A1    Mar. 10, 2016

Related U.S. Application Data

(60) Provisional application No. 61/811,988, filed on Apr. 15, 2013.

(51) Int. Cl.
*F16B 37/14*     (2006.01)
*B64D 45/02*     (2006.01)

(52) U.S. Cl.
CPC .............. *F16B 37/14* (2013.01); *B64D 45/02* (2013.01)

(58) Field of Classification Search
CPC ................................ F16B 37/14; B64D 45/02
(Continued)

(56) References Cited

U.S. PATENT DOCUMENTS 2,710,113 A    6/1955    Pritchard
2,927,495 A    3/1960    Barwood
(Continued)

FOREIGN PATENT DOCUMENTS

CN    102678927    9/2012
DE    10031149     1/2002
(Continued)

OTHER PUBLICATIONS

International Search Report for PCT International Application No. PCT/US2014/034073 dated Jul. 14, 2014, 4 pages.

*Primary Examiner* — Flemming Saether

(57) ABSTRACT

The present disclosure provides methods and articles useful in sealing fasteners, including seal caps and methods of their use, and in particular light weight seal caps having higher dielectric breakdown strength, lower weight, and/or lower wall thick-ness. In some embodiments, the seal caps according to the present invention are made of a material having a dielectric breakdown strength of greater than 1.0 kV/mm, in some embodiments greater than 15.0 kV/mm, and in some embodiments greater than 50.0 kV/mm. In some embodiments, the seal caps according to the present invention are thin-walled, having an average wall thickness of less than 1.5 mm and in some embodiments less than less than 0.5 mm In some embodiments, the seal cap comprises a polyurethane polymer, a polythioether polymer, a polysulfide polymer, a fluorinated thermoplastic polymer, a THV polymer, a
(Continued)

fluorinated thermo-set polymer, an engineering thermoplastic, and/or a PEEK polymer.

44 Claims, 2 Drawing Sheets

(58) Field of Classification Search
USPC .......................................................... 411/377
See application file for complete search history.

(56) References Cited

U.S. PATENT DOCUMENTS

| | | | |
|---|---|---|---|
| 3,470,787 A | 10/1969 | Mackie | |
| 4,382,049 A | 5/1983 | Hofmeister | |
| 4,400,123 A | 8/1983 | Dunegan | |
| 4,519,974 A | 5/1985 | Bravenec | |
| 4,826,380 A | 5/1989 | Henry | |
| 4,905,631 A | 3/1990 | Hayes | |
| 4,971,745 A | 11/1990 | Ferenc | |
| 5,697,745 A | 12/1997 | Shaw | |
| 5,755,908 A | 5/1998 | Rayburn | |
| 5,997,229 A * | 12/1999 | Akers | A47G 3/00 411/372.5 |
| 6,001,301 A * | 12/1999 | Kinoshita | B32B 1/00 118/505 |
| 6,036,804 A | 3/2000 | Rayburn | |
| 6,086,972 A * | 7/2000 | Rayburn | B25B 23/00 411/373 |
| 6,303,870 B1 * | 10/2001 | Nazaryan | H01B 17/00 174/155 |
| 7,134,666 B2 * | 11/2006 | Beyssac | B65D 75/327 206/338 |
| 7,438,974 B2 | 10/2008 | Obuhowich | |
| 7,479,653 B2 | 1/2009 | Gillissen et al. | |
| 7,967,587 B2 | 6/2011 | Bradely | |
| 2007/0190871 A1 * | 8/2007 | Patel | B32B 27/12 442/43 |
| 2008/0134971 A1 | 6/2008 | Bradely | |
| 2012/0074257 A1 | 3/2012 | Bessho | |
| 2012/0155987 A1 | 6/2012 | Watanabe | |
| 2013/0223951 A1 * | 8/2013 | Bessho | B64D 45/02 411/337 |

FOREIGN PATENT DOCUMENTS

| | | |
|---|---|---|
| EP | 0 283 598 | 9/1988 |
| EP | 2465777 | 6/2012 |
| JP | 1976 (S51)-013054 | 2/1976 |
| JP | 2-138488 | 5/1990 |
| JP | 1990(H02)-074612 | 6/1990 |
| JP | 3-69808 | 3/1991 |
| JP | 2000-228140 | 8/2000 |
| WO | WO 2006/101385 | 9/2006 |
| WO | WO 2014-172302 | 10/2014 |

* cited by examiner

LIGHT WEIGHT SEAL CAP

CROSS REFERENCE TO RELATED APPLICATIONS

This application is a national stage filing under 35 U.S.C. 371 of PCT/US2014/034073, filed Apr. 15, 2014, which claims priority to U.S. Application No. 61/811,988, filed Apr. 15, 2013, the disclosure of which is incorporated by reference in its/their entirety herein.

FIELD OF THE DISCLOSURE

This disclosure relates to methods and articles useful in sealing fasteners, including seal caps and methods of their use, and in particular light weight seal caps having higher dielectric breakdown strength, lower weight, and/or lower wall thickness.

SUMMARY OF THE DISCLOSURE

Briefly, the present disclosure provides a method of protecting a fastener comprising the steps of: a) providing a fastener; b) providing a seal cap which defines an interior, wherein the seal cap comprises a material having a dielectric breakdown strength of greater than 1.0 kV/mm, and wherein the seal cap has an average wall thickness of less than 1.5 mm; c) applying an uncured sealant to the interior of the seal cap or to the fastener or to both; and d) positioning the seal cap over the fastener such that at least a portion of the fastener resides in the interior of the seal cap. The method may additionally comprise the step of curing the sealant. In some embodiments, the seal cap is optically translucent and the step of curing the sealant comprises application of actinic radiation to the sealant through the seal cap.

In another aspect, the present disclosure provides a method of protecting a fastener comprising the steps of: f) providing a fastener; g) providing a seal cap which defines an interior, wherein the seal cap comprises a material having a dielectric breakdown strength of greater than 1.0 kV/mm, wherein the seal cap has an average wall thickness of less than 1.5 mm, and wherein the interior of the seal cap contains a quantity of an uncured sealant; and h) positioning the seal cap over the fastener such that at least a portion of the fastener resides in the interior of the seal cap. The method may additionally comprise the step of curing the sealant. In some embodiments, the seal cap is optically translucent and the step of curing the sealant comprises application of actinic radiation to the sealant through the seal cap.

In another aspect, the present disclosure provides a protected fastener construction comprising: q) a fastener; r) a seal cap which defines an interior; and s) a cured sealant; wherein the seal cap comprises a material having a dielectric breakdown strength of greater than 1.0 kV/mm, and wherein the seal cap has an average wall thickness of less than 1.5 mm; wherein the seal cap is positioned over the fastener such that at least a portion of the fastener resides in the interior of the seal cap; and wherein the interior of the seal cap additionally contains the cured sealant which binds the seal cap to the fastener.

In another aspect, the present disclosure provides an application-ready seal cap comprising: v) a seal cap which defines an interior; and w) a quantity of an uncured sealant; wherein the seal cap comprises a material having a dielectric breakdown strength of greater than 1.0 kV/mm, and wherein the seal cap has an average wall thickness of less than 1.5 mm; and wherein the interior of the seal cap contains the quantity of uncured sealant.

In another aspect, the present disclosure provides a seal cap for protection of a fastener comprising a material having a dielectric breakdown strength of greater than 1.0 kV/mm having an average wall thickness of less than 1.5 mm.

DETAILED DESCRIPTION

Figure 1:
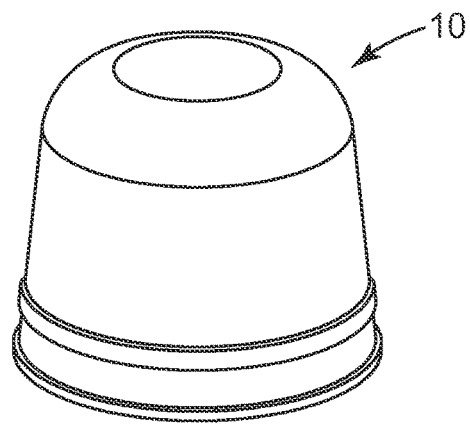
FIG. 1 is an embodiment of a seal cap according to the present invention.
Figure 2A:
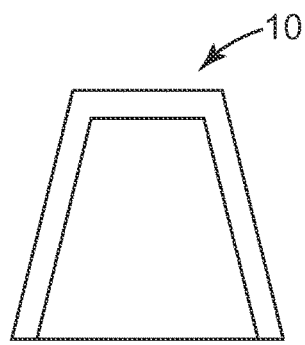
FIGS. 2a-2c are schematic representations of certain embodiments of seal caps according to the present invention.

The present disclosure provides seal caps, methods of their use, and constructions comprising seal caps. In machine construction using rivets, bolts, and other types of fasteners, it may be beneficial to apply a sealant to the exposed portion of the fasteners to protect them from corrosion and to provide electrical insulation. The sealant may also function as a barrier to the passage of fluids, particularly where the fastener protrudes into a fluid containment tank, particularly where that fluid is fuel, and most particularly where that tank is on board an aircraft. In such cases, the fastener may also function to prevent or reduce passage of electrical discharge, such as from a lightning strike, into the interior of a fuel tank. The seal caps according to the present disclosure may be useful in sealing fasteners in many such applications. FIGS. 1 and 2a each represent an embodiment of a seal cap 10 according to the present invention.

In some embodiments, the seal caps according to the present invention are translucent. As used herein, the term "translucent" means able to transmit some portion of visible light, typically greater than 20% of light in the 360-750 nm wavelength range, in some embodiments greater than 30%, in some embodiments greater than 40%, and in some embodiments greater than 50%. In some embodiments, the seal caps according to the present invention are optically transparent, meaning transparent to the extent that the article does not prevent a viewer from resolving an image, e.g., reading text. In some embodiments, seal caps according to the present invention permit visual inspection for flaws in construction or installation or both.

In some embodiments, the seal caps according to the present invention are made of a material having a dielectric breakdown strength of greater than 1.0 kV/mm, in some embodiments greater than 5.0 kV/mm, in some embodiments greater than 10.0 kV/mm, in some embodiments greater than 15.0 kV/mm, in some embodiments greater than 30.0 kV/mm, in some embodiments greater than 40.0 kV/mm, and in some embodiments greater than 50.0 kV/mm. In some embodiments, the use of a material having a higher dielectric breakdown strength permits the manufacture of a lighter seal cap.

In some embodiments, the seal caps according to the present invention are thin-walled. In some embodiments, the seal caps have an average wall thickness of less than 1.5 mm, in some embodiments less than 1.2 mm, in some embodiments less than 1.0 mm, in some embodiments less than 0.5 mm, in some embodiments less than 0.2 mm, in some embodiments less than 0.1 mm, and in some embodiments less than 0.08 mm.

The seal caps may be made of any suitable material. In some embodiments, the material is jet fuel resistant. In some embodiments, the material has a TB (brittle temperature) below −20° C. In some embodiments, the seal cap comprises a polyurethane polymer. In some embodiments, the seal cap comprises a polythioether polymer. In some embodiments, the seal cap comprises a polysulfide polymer. In some embodiments, the seal cap comprises a fluorinated thermoplastic polymer. In some embodiments, the seal cap comprises a THV polymer. In some embodiments, the seal cap comprises a fluorinated thermoset polymer. In some embodiments, the seal cap comprises an engineering thermoplastic. In some embodiments, the seal cap comprises a PEEK polymer. In some embodiments, the seal cap comprises a mixture of a polymer and a nanoparticulate filler. In some embodiments, the seal cap comprises a mixture of a polymer and a nanoparticulate curative. In some embodiments, the seal cap comprises no fillers or other particulates having an average particle size greater than 10 nm, in some embodiments not greater than 5 nm, and in some embodiments not greater than 1 nm.

In some embodiments, the seal cap and sealant comprise different materials. In some embodiments, the seal cap and sealant do not comprise different materials.

Figure 2B:
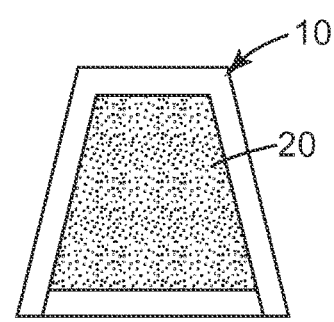

In some embodiments, the seal cap is at least partially filled with sealant. With reference to FIG. 2b, seal cap 10 may be filled with sealant 20. In some embodiments, the seal cap is at least partially filled with sealant shortly before use. In some embodiments, the seal cap is at least partially filled with sealant and stored in ready-to-use form. In some such embodiments, a filled or partially filled cap is stored at low temperature. In some such embodiments, the filled or partially filled cap must be thawed before use. In some embodiments, the seal cap is at least partially filled with sealant prior to application to a fastener. In some embodiments, the seal cap is at least partially filled with sealant after application to a fastener, e.g., by syringe, by a sealant port, or the like. In some embodiments, the seal cap is applied to a fastener after application of sealant to the fastener. In some embodiments, the fastener penetrates a substrate article. In some embodiments, the fastener protrudes from a surface of a substrate article. In some embodiments the substrate article is a composite material. In some embodiments, the substrate article is an epoxy matrix and glass or carbon fiber composite material. In some embodiments, every portion of the fastener which protrudes from the substrate article is covered by cured sealant or seal cap or both. In some embodiments, every portion of the fastener which protrudes from the substrate article is covered by cured sealant.

Figure 2C:
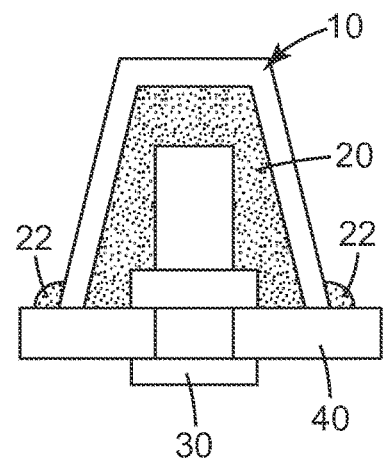

With reference to FIG. 2c, in one embodiment, seal cap 10 filled with sealant 20 covers fastener 30 which protrudes from substrate article 40. Some excess amount of sealant 22 may be pressed out of seal cap 10 during application.

The sealant may be any suitable material. In some embodiments, the material is jet fuel resistant. In some embodiments, the material has a TB (brittle temperature) below −20° C. In some embodiments, the sealant comprises a polyurethane polymer. In some embodiments, the sealant comprises a polythioether polymer. In some embodiments, the sealant comprises a polysulfide polymer. In some embodiments, the sealant comprises a mixture of a polymer and a nanoparticulate filler. In some embodiments, the sealant comprises a mixture of a polymer and a nanoparticulate curative. In some embodiments, the seal cap comprises no fillers or other particulates having an average particle size greater than 10 nm, in some embodiments not greater than 5 nm, and in some embodiments not greater than 1 nm.

The seal cap material and sealant material may be chosen such that strong bonds are formed between the sealant and the seal cap. The sealant material may be chosen such that strong bonds are formed between the sealant and the substrate. Optionally, the sealant material may be chosen such that strong bonds are formed between the sealant and the fastener.

After application of seal cap and sealant to a fastener the sealant is typically cured. In some embodiments, the sealant is a radiation cured sealant. In some embodiments, the sealant is cured by application of actinic radiation to the sealant. In some embodiments, the sealant is cured by application of green light to the sealant. In some embodiments, the sealant is cured by application of blue light to the sealant. In some embodiments, the sealant is cured by application of violet light to the sealant. In some embodiments, the sealant is cured by application of UV light to the sealant. In some embodiments, the sealant is cured by application of radiation to the sealant through a translucent seal cap. In some embodiments, the sealant is substantially fully cured in less than 60 seconds, in some embodiments less than 30 seconds, and in some embodiments less than 10 seconds. In some embodiments, cure is accomplished by addition of a curing agent shortly prior to use. In some embodiments, cure is accomplished by heat cure at ambient conditions. In some embodiments, cure is accomplished by heat cure by application of heat from a heat source.

In some embodiments, a combination seal and seal cap is molded in place over a fastener using a seal cap mold. In some embodiments, the seal cap mold is translucent or transparent to allow inspection and radiation cure of the form-in place seal and seal cap.

Figure 3A:
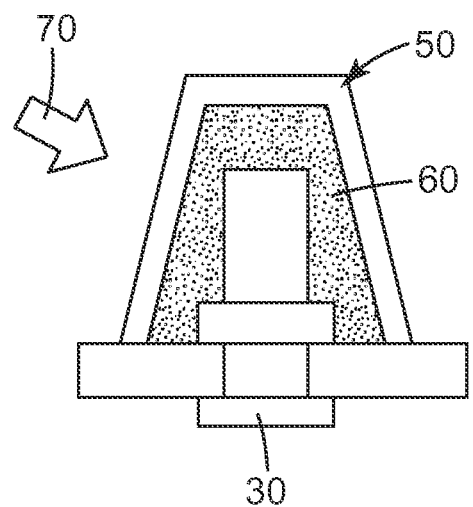
FIG. 3a is a schematic representation of an embodiment of a step in a process for making a sealed fastener according to the present invention.
Figure 3B:
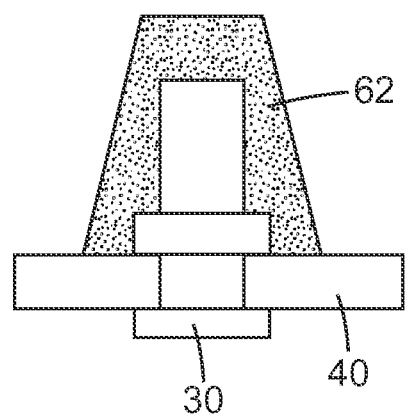
FIG. 3b is a schematic representation of one embodiment of a sealed fastener according to the present invention.

FIG. 3a depicts one embodiment of such a process, wherein seal cap mold 50 containing sealant 60 is located over fastener 30 which protrudes from substrate article 40. In this embodiment, sealant 60 is cured by application of radiation 70. FIG. 3b depicts the completed seal 62 after removal of seal cap mold 50.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

Abbreviations for the materials used in the examples are as follows:

AC-240: A gray two-part polysulfide-based sealant, having a cured specific gravity of 1.61, obtained under the trade designation "AEROSPACE SEALANT AC-240 CLASS B" from 3M Company, St. Paul, Minn.

AC-360: A brown two-part polysulfide-based sealant, having a cured specific gravity of 1.40, obtained under the trade designation "AEROSPACE SEALANT AC-360 CLASS B" from 3M Company.

AC-380: A gray two-part polysulfide-based sealant, having a cured specific gravity of 1.10, obtained under the trade designation "AEROSPACE SEALANT AC-380 CLASS B" from 3M Company.

APTIV: A 2-mil (50.8 m) unfilled semi-crystalline polyetheretherketone film, obtained under the trade designation "APTIV 1000-050G" from Victrex USA, Inc., West Conshohocken, Pa.

DABCO-33LV: A solution of 33% triethylenediamine and 67% dipropylene glycol, obtained under the trade designation "DABCO-33LV" from Air Products & Chemicals, Inc., Allentown, Pa.

DMDO: 1,8-Dimercapto-3,6-dioxaoctane, obtained from Arkena, Inc., King of Prussia, Pa.

DVE-2: Diethyleneglycol divinylether, obtained from BASF Corp., Florham Park, N.J.

DVE-3: Triethyleneglycol divinylether, obtained under the trade designation "RAPI-CURE DVE-3" from Ashland Specialty Ingredients, Wilmington, Del.

E-8220: A diglycidylether of bisphenol F, obtained under the trade designation "EPALLOY 8220" from Emerald Performance Materials, LLC, Cuyahoga Falls, Ohio.

GE-30: Trimethylolpropane triglycidylether, obtained under the trade designation "ERISYS GE-30" from Emerald Performance Materials Company.

I-819: Phenylbis(2,4,6-trimethylbenzoyl)phosphine Oxide, obtained under the trade designation "IRGACURE 819" from BASF Corp.

IPA: Isopropyl alcohol.

MEK: Methyl ethyl ketone.

PR-1776: A brown two-part polysulfide-based sealant, having a cured specific gravity of 1.29, obtained under the trade designation "PR-1776M CLASS B LOW WEIGHT FUEL TANK SEALANT" from PPG Aerospace/PRC-Desoto International, Inc., Sylmar, Calif.

PTE-1: A liquid polythioether polymer prepared as follows. Into a 5 liter round bottom flask equipped with an air driven stirrer, thermometer, and a condenser, was added 167.1 grams (0.51 mol) E-8220 and 1641 grams (9.0 mol) DMDO. After several minutes of stirring the mixture exothermed to 45° C. After another 30 minutes, the temperature of the flask was increased 75° C. and a mixture of 1428.1 grams (7.1 mol) DVE-3, 50.7 grams (0.2 mol) TAC and 13.1 grams (0.07 mol) VAZO-67 was added drop wise. The reaction proceeded substantially to completion affording 3,300 grams of polythioether polymer.

PTE-2 Into a 1000-ml round bottom flask equipped with an air-driven stirrer, thermometer, and a dropping funnel, was added 392.14 grams (2.15 moles) DMDO and 82.23 gram (0.25 mole) Epalloy 8220; 0.15 g DABCO (0.03 weight percent) was mixed in as a catalyst. The system was flushed with nitrogen, then mixed and heated for four hours at 60-70° C. 12.5 g (0.05 mole) of triallylcyanurate was added along with approximate 0.15 g Vazo 67. The material is mixed and heated at approximately 60° C. for 30-45 minutes. 313.13 g (1.55 moles) DVE-3 was then added drop-wise to the flask over 45 minutes, keeping the temperature between 68-80° C. Vazo 67 is added in approximately 0.15 g units over approximately 6 hours for a total of 0.4-0.6 g. The temperature is raised to 100° C. and the material degassed for approximately 10 minutes. The resultant polythioether is approximately 3200 MW with 2.2 functionality.

TAC: Triallylcyanurate, obtained from Sartomer, Inc., Exton, Pa.

THV-200: A colorless, transparent fluoroelastomer, obtained under the trade designation "THV 200" from 3M Company.

THV-200W: White pigmented THV 200, meeting the specifications for Federal Standard 595B, Color #17529, obtained from 3M Company.

THV-500: A colorless, transparent fluoroelastomer, obtained under the trade designation "THV 500" from 3M Company.

VAZO-67: 2,2'-azobis(2-methylbutyronitrile), obtained under the trade designation "VAZO-67" from E.I. du Dupont de Nemours and Company, Wilmington, Del.

Test Methods

Composite Test Panels.

Composite panels for lighting strike testing and seal cap installation were made using the follow materials and methods. Ten layers of unidirectional pre-preg, type "P2353W-19-30S", obtained from Toray Composites (America), Inc., Tacoma, Wash., were oriented 45,135,0,90,0,0,90,0,135,45 to give a balanced structure. A layer of woven graphite fabric, type "CYCOM 970/PWC T300 3K NT" from Cytec Industries, Inc., Woodland Park, N.J. was placed on each side of the 10-ply stack of pre-preg. The panel's size was nominally 12 by 12 inches (30.48 by 30.48 cm). The lay-up was then bagged using standard autoclave bagging practices and cured in an autoclave at 90 psi (620.5 kPa) under full vacuum at 350° F. (176.7° C.) for 2 hours. The panels were then cut in half and match drilled with ten holes to take Hi-Shear fastener shanks, Part No. "HL10VAZ6-3", obtained from Peerless Aerospace Fastener Co., Farmington, N.Y. The panels were drilled such that there was an overlap of 1 inch (2.54 cm) with the fasteners uniformly spaced along the center of the overlap joint. The two panels halves were joined together using the above mentioned shank and collar assembly, Part No. "HL94W6", also from Peerless Aerospace Fastener Co. The joint was wetted with AC-240 placed between the two panels and into the holes before tightening the fasteners. The final test panel had 10 fasteners centrally located in the overlap joint spaced uniformly across its 10 inch (25.4 cm) width.

Lightning Strike Test.

Composite panels having test fasteners covered with seal caps of the present invention was electrically grounded at the ends opposite the overlap joint. The cap side of the panel was placed inside a dark box, with a high speed camera positioned to record the event, and the electrode positioned 1.0 inches (2.54 cm) distant from the panel and directly opposite the target fastener. An igniter wire was used to direct the arc to attach to the target fastener. 21 kA to 103 kA peak amplitude was imposed as the "D" bank component as described in SAE ARP1512. The "B" and "C" components were not used for this test. Various voltages were applied for each test and recorded. The pass fail for the tests was based on observed light in the dark box around the fastener.

Seal Caps.

Comparative A.

AC-360 sealant mixture was prepared in a 10:1 base:accelerator weight ratio at 70° F. (21.1° C.) and injected into the female tooling of an 8 by 8 inch (20.32 by 20.32 cm) 9-cavity aluminum seal cap mold the cavities were designed to give a frusto-conical shaped cap with a base diameter of 15 mm a height of 15 mm and a wall thickness of 2.5 mm. The male tooling closed the mold and the sealant cured for approximately 12 hours at 75° F. (23.9° C.), followed by 1 hour at 130° F. (54.4° C.). The resulting seal cap was then removed from the tool.

Comparative B.

The general procedure described in Comparative A was repeated, wherein AC-360 was substituted with PR-1776.

Comparative C

A curable polythioether composition was prepared as follows. A 40 ml. amber glass vial was charged with 10 grams PTE-1 and 0.604 grams TAC at 21° C. To this was added 0.106 grams I-819. The vial was then sealed and placed on a laboratory roller mill for 30 minutes at 50° C. until the I-819 had dissolved. Part of this mixture was then injected into the female tool of the 8 by 8 inch (20.32 by 20.32 cm) 9-cavity aluminum seal cap mold. A clear epoxy male tool was then used to close the mold and the composition cured by exposure, through the male tool, to a 455 nm LED, model "CF 2000" from Clearstone Technologies, Inc., Minneapolis, Minn., for 1 minute at a distance of 0.2 inches (0.51 cm). The resulting seal cap was then removed from the tool.

Example 1

A 50:50 by weight mixture of THV-200 and MEK was brushed onto a single impression male tool dimensioned to give a frusto-conical shaped cap with a base diameter of 10mm and a height of 10 mm and allowed to dry at 70° F. (21.1° C.) for approximately 60 minutes. A second application of the fluoroelastomer solution was applied to the male tool and again allowed to dry giving a wall thickness of about 0.25 mm. The finished cap was removed from the tool and trimmed, resulting in a light weight clear seal cap.

Example 2

A white fluorinated polymer backing was prepared by feeding a uniform mixture of pellets having 97 weight percent THV 500 and 3 weight percent THV 200 W into an extruder. The uniform mixture was extruded to a uniform thickness of 43 m onto a smooth 127 m thick polyethylene carrier web using a Haake extruder. The unsupported film was then positioned and clamped over the single impression male tool, located over a vacuum table. The film was then heated to 400° F. (204.4° C.) using radiant heat. After the film started to sag the tool was driven up into the film and a vacuum applied to pull the film over the tool. The film was then cooled to approximately 21° C., removed from the male tool and trimmed, resulting in a light weight seal cap.

Example 3

A sheet of APTIV brand PEEK film was positioned over the single impression male tool that had been pre-heated to 200° C. The film was then softened and deformed over the male tool by means of a hot air gun. A pre-formed cap was then pressed over the softened film and male tool, after which the assembly was cooled to approximately 21° C. The pre-formed cap was then removed, revealing a light weight, translucent PEEK film cap, which was then removed from the male tool and trimmed Example 4

A cross-linkable fluoroelastomer solution was prepared as follows. 3.75 grams of a 20:80 by weight mixture of THV-200 and MEK was mixed with 1.5 grams of a 5% by weight solution of gamma-aminopropyltrimethoxysilane in IPA at 21° C. The solution was brushed onto a conical shaped, single impression, male tool having a conical shaped cap with a base diameter of 10 mm and a height of 10 mm, and dried at 21° C. for approximately 60 minutes. A second application of the cross-linkable fluoroelastomer solution was applied over the first coating, and dried at 21° C. for approximately 60 minutes, resulting in a total wall thickness of about 0.25 mm. The coated tool was then placed in an oven set at 60° C. for 30 minutes in order to crosslink the polymer, after which the tool removed from the oven, cooled to 21° C., and the resulting light weight translucent seal cap removed from the tool and trimmed Seal Caps with Sealant Cores.

Example 5

A clear polythioether resin composition was prepared as follows. 100 grams PTE-2 was homogeneously mixed with 6.78 grams GE-30, 4.52 grams E-8220 and 1.00 grams DABCO-33LV at 21° C. Part of this mixture was then poured into a seal cap made according to Example 1. This produced a light weight filled cap assembly. The filled seal cap assembly was then placed onto a fastener on the composite panel and cured at 21° C. for 24 hours. This resulted in a fastener protected by a light weight clear cured seal cap.

Example 6

A seal cap made according to Example 2 was filled with AC-240, which was prepared by mixing in a 10:1 by weight base: accelerator ratio at 21° C. This produced a light weight filled cap assembly. The cap assembly was then placed onto a fastener on a composite panel and cured at 21° C. for 24 hours. This resulted in a fastener protected by a light weight cured seal cap.

Example 7

A clear polythioether resin composition was prepared as follows. A 40 ml. amber glass vial was charged with 7.000 grams DMDO, 4.439 grams DVE-2 and 1.812 grams TAC at 21° C. To this was added 0.132 grams I-819. The vial was then sealed and placed on a laboratory roller mill for 10 minutes until the I-819 had dissolved. Part of this mixture was then poured into a seal cap made according to Example 1. This produced a light weight filled cap assembly. The filled seal cap assembly was then placed onto a fastener on the composite panel and cured by exposure to the 455 nm, model "CF 2000" LED for 30 seconds at a distance of 1 inch to the composite panel. This resulted in a fastener protected by a light weight clear cured seal cap.

Example 8

A filled translucent seal cap was prepared as generally described in Example 5, wherein the polythioether seal cap was replaced by a PEEK seal cap made according to Example 3.

Example 9

A filled translucent seal cap was prepared as generally described in Example 8, wherein the PEEK seal cap was replaced by a cross-linkable fluoroelastomer seal cap made according to Example 4.

Comparative D

A seal cap made according to Comparative B was filled with PRC-1776, which was prepared by mixing in a 10:1 by weight base: accelerator ratio at 21° C. The cap assembly was then placed onto a fastener on a composite panel and cured at 21° C. for 24 hours. This resulted in a fastener protected by a standard weight cured seal cap.

Comparative E

A seal cap made according to Comparative A was filled with AC-360, which was prepared by mixing in a 10:1 by weight base: accelerator ratio at 21° C. The cap assembly was then placed onto a fastener on a composite panel and cured at 21° C. for 24 hours. This resulted in a fastener protected by a standard weight cured seal cap.

Comparative F

A fastener protected by a standard weight cured seal cap having a light weight cured sealant core was made according to the general procedure described in Comparative E, wherein the AC-360 sealant core was substituted with AC-380.

Lightning strike tests of selected Examples and Comparatives D-F are reported in Table 1. Cap weights and cap densities of selected Examples and Comparative are A-C listed in Tables 2 and 3. Dielectric breakdown strength for cap materials is reported in Table 4.

TABLE 1

| Example | Test # | Peak Current kA | Pass/Fail |
| --- | --- | --- | --- |
| Example 6 | 1 | 21 | Pass |
|  | 2 | 24 | Pass |
|  | 3 | 27 | Pass |
|  | 4 | 28 | Pass |
| Comparative D | 1 | 21 | Pass |
|  | 2 | 21 | Pass |
|  | 3 | 27 | Pass |
| Comparative E | 1 | 21 | Pass |
|  | 2 | 27 | Pass |
|  | 3 | 28 | Pass |
| Comparative F | 1 | 28 | Pass |
|  | 2 | 28 | Pass |
|  | 3 | 33 | Pass |

TABLE 2

| Cap Example | Composition | Cap Weight (grams) |
| --- | --- | --- |
| Example 1 | THV | 0.05 |
| Example 2 | THV | 0.05 |
| Comparative A | Polysulfide | 1.81 |
| Comparative B | Polysulfide | 2.01 |

TABLE 3

| Cap Example | Composition | Cap Weight (grams) |
| --- | --- | --- |
| Comparative C | Polythioether | 1.75 |

TABLE 4

| Cap of Example | Cap Material | Dielectric Breakdown Strength kV/mm |
| --- | --- | --- |
| Comparatives A, B, D, E, F | Polysulfide | 0.35 |
| Examples 1, 2, 5, 6, 7 | THV | 62 |

TABLE 4-continued

| Cap of Example | Cap Material | Dielectric Breakdown Strength kV/mm |
| --- | --- | --- |
| Examples 3, 9 | PEEK | 20 |

The present disclosure includes following numbered list of illustrative embodiments:

1. A method of protecting a fastener comprising the steps of:
    a) providing a fastener;
    b) providing a seal cap which defines an interior, wherein the seal cap comprises a material having a dielectric breakdown strength of greater than 1.0 kV/mm, and wherein the seal cap has an average wall thickness of less than 1.5 mm;
    c) applying an uncured sealant to the interior of the seal cap or to the fastener or to both; and
    d) positioning the seal cap over the fastener such that at least a portion of the fastener resides in the interior of the seal cap.
2. The method according to embodiment 1 wherein step c) is performed before step d).
3. The method according to embodiment 1 wherein step d) is performed before step c).
4. The method according to any of embodiments 1-3 wherein the seal cap is optically translucent.
5. The method according to any of embodiments 1-4 wherein the seal cap is visibly transparent.
6. The method according to any of the preceding embodiments additionally comprising the step of:
    e) curing the sealant.
7. The method according to embodiment 6 wherein the seal cap is optically translucent and wherein said step of curing the sealant comprises application of actinic radiation to the sealant through the seal cap.
8. The method according to any of embodiments 6-7 wherein the fastener protrudes from a first surface of a substrate article and wherein, following steps c), d) and e), every portion of the fastener which protrudes from the first surface of the substrate article is covered by cured sealant or seal cap or both.
9. A method of protecting a fastener comprising the steps of:
    f) providing a fastener;
    g) providing a seal cap which defines an interior, wherein the seal cap comprises a material having a dielectric breakdown strength of greater than 1.0 kV/mm, wherein the seal cap has an average wall thickness of less than 1.5 mm, and wherein the interior of the seal cap contains a quantity of an uncured sealant; and
    h) positioning the seal cap over the fastener such that at least a portion of the fastener resides in the interior of the seal cap.
10. The method according to embodiment 9 wherein the seal cap and uncured sealant recited in step g) are at a temperature of less than 5° C., and wherein the method additionally comprises the step of:
    i) warming the seal cap and uncured sealant to a temperature of at least 20° C.
11. The method according to embodiment 9 or 10 wherein the seal cap is optically translucent.
12. The protected fastener construction according to any of embodiments 9-11 wherein the seal cap is visibly transparent.

13. The method according to any of embodiments 9-12 additionally comprising the step of:
j) curing the sealant.

14. The method according to embodiment 13 wherein the seal cap is optically translucent and wherein said step of curing the sealant comprises application of actinic radiation to the sealant through the seal cap.

15. The method according to any of embodiments 13-14 wherein the fastener protrudes from a first surface of a substrate article and wherein, following step j), every portion of the fastener which protrudes from the first surface of the substrate article is covered by cured sealant or seal cap or both.

16. The method according to embodiment 8 or embodiment 15 wherein said first surface is an interior surface of a fuel container.

17. The method according to embodiment 16 wherein said first surface is an interior surface of a fuel container of an aircraft.

18. The method according to any of embodiments 6-8 and 13-17 wherein the seal cap and cured sealant substantially prevent electrical arcing around the fastener.

19. The method according to any of the preceding embodiments wherein the seal cap comprises a material having a dielectric breakdown strength of greater than 5.0 kV/mm.

20. The method according to any of the preceding embodiments wherein the seal cap comprises a material having a dielectric breakdown strength of greater than 10.0 kV/mm.

21. The method according to any of the preceding embodiments wherein the seal cap comprises a material having a dielectric breakdown strength of greater than 15.0 kV/mm.

22. The method according to any of the preceding embodiments wherein the seal cap comprises a material having a dielectric breakdown strength of greater than 30.0 kV/mm.

23. The method according to any of the preceding embodiments wherein the seal cap comprises a material having a dielectric breakdown strength of greater than 50.0 kV/mm.

24. The method according to any of the preceding embodiments wherein the seal cap has an average wall thickness of less than 1.0 mm.

25. The method according to any of the preceding embodiments wherein the seal cap has an average wall thickness of less than 0.5 mm.

26. The method according to any of the preceding embodiments wherein the seal cap has an average wall thickness of less than 0.1 mm.

27. The method according to any of embodiments 1-26 wherein the seal cap comprises a fluorinated thermoplastic polymer.

28. The method according to any of embodiments 1-26 wherein the seal cap comprises a THV polymer.

29. The method according to any of embodiments 1-26 wherein the seal cap comprises a fluorinated thermoset polymer.

30. The method according to any of embodiments 1-26 wherein the seal cap comprises an engineering thermoplastic.

31. The method according to any of embodiments 1-26 wherein the seal cap comprises a PEEK polymer.

32. The method according to any of the preceding embodiments wherein the uncured sealant is translucent.

33. The method according to any of the preceding embodiments wherein the uncured sealant is visibly transparent.

34. The method according to any of the preceding embodiments wherein the uncured sealant cures to form a material that is translucent.

35. The method according to any of the preceding embodiments wherein the uncured sealant cures to form a material that is visibly transparent.

36. The method according to any of embodiments 1-35 wherein the sealant comprises a polyurethane polymer.

37. The method according to any of embodiments 1-35 wherein the sealant comprises a polythioether polymer.

38. The method according to any of embodiments 1-35 wherein the sealant comprises a polysulfide polymer.

39. The method according to any of the preceding embodiments wherein the sealant comprises a mixture of a polymer and a nanoparticulate filler.

40. The method according to any of the preceding embodiments wherein the sealant comprises a mixture of a polymer and a nanoparticulate curative.

41. A protected fastener construction comprising:
q) a fastener;
r) a seal cap which defines an interior; and
s) a cured sealant;
wherein the seal cap comprises a material having a dielectric breakdown strength of greater than 1.0 kV/mm, and wherein the seal cap has an average wall thickness of less than 1.5 mm;
wherein the seal cap is positioned over the fastener such that at least a portion of the fastener resides in the interior of the seal cap; and
wherein the interior of the seal cap additionally contains the cured sealant which binds the seal cap to the fastener.

42. The protected fastener construction according to embodiment 41 wherein the fastener protrudes from a first surface of a substrate article and wherein every portion of the fastener which protrudes from the first surface of the substrate article is covered by cured sealant or seal cap or both.

43. The protected fastener construction according to embodiment 42 wherein said first surface is an interior surface of a fuel container.

44. The protected fastener construction according to embodiment 42 wherein said first surface is an interior surface of a fuel container of an aircraft.

45. The protected fastener construction according to any of embodiments 41-44 wherein the seal cap and cured sealant substantially prevent electrical arcing around the fastener.

46. The protected fastener construction according to any of embodiments 41-45 wherein the seal cap is translucent.

47. The protected fastener construction according to any of embodiments 41-46 wherein the seal cap is visibly transparent.

48. The protected fastener construction according to any of embodiments 41-47 wherein the seal cap comprises a material having a dielectric breakdown strength of greater than 5.0 kV/mm.

49. The protected fastener construction according to any of embodiments 41-47 wherein the seal cap comprises a material having a dielectric breakdown strength of greater than 10.0 kV/mm.

50. The protected fastener construction according to any of embodiments 41-47 wherein the seal cap comprises a material having a dielectric breakdown strength of greater than 15.0 kV/mm.

51. The protected fastener construction according to any of embodiments 41-47 wherein the seal cap comprises a material having a dielectric breakdown strength of greater than 30.0 kV/mm.

52. The protected fastener construction according to any of embodiments 41-47 wherein the seal cap comprises a material having a dielectric breakdown strength of greater than 50.0 kV/mm.

53. The protected fastener construction according to any of embodiments 41-52 wherein the seal cap has an average wall thickness of less than 1.0 mm.

54. The protected fastener construction according to any of embodiments 41-52 wherein the seal cap has an average wall thickness of less than 0.5 mm.

55. The protected fastener construction according to any of embodiments 41-52 wherein the seal cap has an average wall thickness of less than 0.1 mm.

56. The protected fastener construction according to any of embodiments 41-55 wherein the seal cap comprises a fluorinated thermoplastic polymer.

57. The protected fastener construction according to any of embodiments 41-55 wherein the seal cap comprises a THV polymer.

58. The protected fastener construction according to any of embodiments 41-55 wherein the seal cap comprises a fluorinated thermoset polymer.

59. The protected fastener construction according to any of embodiments 41-55 wherein the seal cap comprises an engineering thermoplastic.

60. The protected fastener construction according to any of embodiments 41-55 wherein the seal cap comprises a PEEK polymer.

61. The protected fastener construction according to any of embodiments 41-60 wherein the cured sealant is translucent.

62. The protected fastener construction according to any of embodiments 41-61 wherein the cured sealant is visibly transparent.

63. The protected fastener construction according to any of embodiments 41-62 wherein the cured sealant comprises a polyurethane polymer.

64. The protected fastener construction according to any of embodiments 41-62 wherein the cured sealant comprises a polythioether polymer.

65. The protected fastener construction according to any of embodiments 41-62 wherein the cured sealant comprises a polysulfide polymer.

66. The protected fastener construction according to any of embodiments 41-62 wherein the cured sealant comprises a mixture of a polymer and a nanoparticulate filler.

67. The protected fastener construction according to any of embodiments 41-62 wherein the cured sealant comprises a mixture of a polymer and a nanoparticulate curative.

68. An application-ready seal cap comprising:
v) a seal cap which defines an interior; and
w) a quantity of an uncured sealant;
wherein the seal cap comprises a material having a dielectric breakdown strength of greater than 1.0 kV/mm, and wherein the seal cap has an average wall thickness of less than 1.5 mm; and wherein the interior of the seal cap contains the quantity of uncured sealant.

69. The application-ready seal cap according to embodiment 68 wherein the seal cap is translucent.

70. The application-ready seal cap according to embodiment 68 wherein the seal cap is optically transparent.

71. The application-ready seal cap according to any of embodiments 68-70 wherein the seal cap comprises a material having a dielectric breakdown strength of greater than 5.0 kV/mm.

72. The application-ready seal cap according to any of embodiments 68-70 wherein the seal cap comprises a material having a dielectric breakdown strength of greater than 10.0 kV/mm.

73. The application-ready seal cap according to any of embodiments 68-70 wherein the seal cap comprises a material having a dielectric breakdown strength of greater than 15.0 kV/mm.

74. The application-ready seal cap according to any of embodiments 68-70 wherein the seal cap comprises a material having a dielectric breakdown strength of greater than 30.0 kV/mm.

75. The application-ready seal cap according to any of embodiments 68-70 wherein the seal cap comprises a material having a dielectric breakdown strength of greater than 50.0 kV/mm.

76. The application-ready seal cap according to any of embodiments 68-75 wherein the seal cap has an average wall thickness of less than 1.0 mm.

77. The application-ready seal cap according to any of embodiments 68-75 wherein the seal cap has an average wall thickness of less than 0.5 mm.

78. The application-ready seal cap according to any of embodiments 68-75 wherein the seal cap has an average wall thickness of less than 0.1 mm.

79. The application-ready seal cap according to any of embodiments 68-78 wherein the seal cap comprises a fluorinated thermoplastic polymer.

80. The application-ready seal cap according to any of embodiments 68-78 wherein the seal cap comprises a THV polymer.

81. The application-ready seal cap according to any of embodiments 68-78 wherein the seal cap comprises a fluorinated thermoset polymer.

82. The application-ready seal cap according to any of embodiments 68-78 wherein the seal cap comprises an engineering thermoplastic.

83. The application-ready seal cap according to any of embodiments 68-78 wherein the seal cap comprises a PEEK polymer.

84. The application-ready seal cap according to any of embodiments 68-83 wherein the uncured sealant is translucent.

85. The application-ready seal cap according to any of embodiments 68-84 wherein the uncured sealant is visibly transparent.

86. The application-ready seal cap according to any of embodiments 68-85 wherein the uncured sealant cures to form a material that is translucent.

87. The application-ready seal cap according to any of embodiments 68-86 wherein the uncured sealant cures to form a material that is visibly transparent.

88. The application-ready seal cap according to any of embodiments 68-87 wherein the sealant comprises a polyurethane polymer.

89. The application-ready seal cap according to any of embodiments 68-87 wherein the sealant comprises a polythioether polymer.

90. The application-ready seal cap according to any of embodiments 68-87 wherein the sealant comprises a polysulfide polymer.

91. The application-ready seal cap according to any of embodiments 68-90 wherein the sealant comprises a mixture of a polymer and a nanoparticulate filler.

92. The application-ready seal cap according to any of embodiments 68-91 wherein the sealant comprises a mixture of a polymer and a nanoparticulate curative.

93. The application-ready seal cap according to any of embodiments 68-92 maintained at a temperature of less than 5° C.

94. A seal cap for protection of a fastener comprising a material having a dielectric breakdown strength of greater than 1.0 kV/mm having an average wall thickness of less than 1.5 mm.

95. The seal cap according to embodiment 94 which is translucent.

96. The seal cap according to embodiment 94 which is optically transparent.

97. The seal cap according to any of embodiments 94-96 which comprises a material having a dielectric breakdown strength of greater than 5.0 kV/mm.

98. The seal cap according to any of embodiments 94-96 which comprises a material having a dielectric breakdown strength of greater than 10.0 kV/mm.

99. The seal cap according to any of embodiments 94-96 which comprises a material having a dielectric breakdown strength of greater than 15.0 kV/mm.

100. The seal cap according to any of embodiments 94-96 which comprises a material having a dielectric breakdown strength of greater than 30.0 kV/mm.

101. The seal cap according to any of embodiments 94-96 which comprises a material having a dielectric breakdown strength of greater than 50.0 kV/mm.

102. The seal cap according to any of embodiments 94-101 having an average wall thickness of less than 1.0 mm.

103. The seal cap according to any of embodiments 94-101 having an average wall thickness of less than 0.5 mm.

104. The seal cap according to any of embodiments 94-101 having an average wall thickness of less than 0.1 mm.

105. The seal cap according to any of embodiments 94-104 comprising a fluorinated thermoplastic polymer.

106. The seal cap according to any of embodiments 94-104 comprising a THV polymer.

107. The seal cap according to any of embodiments 94-104 comprising a fluorinated thermoset polymer.

108. The seal cap according to any of embodiments 94-104 comprising an engineering thermoplastic.

109. The seal cap according to any of embodiments 94-104 comprising a PEEK polymer.

Vaious modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method of protecting a fastener comprising the steps of:
    a) providing a fastener;
    b) providing a seal cap which defines an interior, wherein the seal cap comprises a material having a dielectric breakdown strength of greater than 30.0 kV/mm, and wherein the seal cap has an average wall thickness of less than 0.5 mm;
    c) applying an uncured sealant to the interior of the seal cap or to the fastener or to both; and
    d) positioning the seal cap over the fastener such that at least a portion of the fastener resides in the interior of the seal cap.

2. The method according to claim 1 wherein the seal cap comprises a material having a dielectric breakdown strength of greater than 40.0 kV/mm.

3. The method according to claim 1 wherein the seal cap comprises a material having a dielectric breakdown strength of greater than 50.0 kV/mm.

4. The method according to claim 1 wherein the seal cap comprises a fluorinated thermoplastic polymer.

5. The method according to claim 1 wherein the seal cap comprises a fluorinated thermoset polymer.

6. The method according to claim 1 wherein the seal cap comprises an engineering thermoplastic.

7. The method according to claim 1 wherein the seal cap comprises a PEEK polymer.

8. The method according to claim 1 wherein the sealant comprises a polythioether polymer.

9. The method according to claim 1 wherein the seal cap comprises a THV polymer.

10. A method of protecting a fastener comprising the steps of:
    f) providing a fastener;
    g) providing a seal cap which defines an interior, wherein the seal cap comprises a material having a dielectric breakdown strength of greater than 30.0 kV/mm, wherein the seal cap has an average wall thickness of less than 0.5 mm, and wherein the interior of the seal cap contains a quantity of an uncured sealant; and
    h) positioning the seal cap over the fastener such that at least a portion of the fastener resides in the interior of the seal cap.

11. The method according to claim 10 additionally comprising the step of:
    j) curing the sealant.

12. The method according to claim 11 wherein the seal cap is optically translucent and wherein said step of curing the sealant comprises application of actinic radiation to the sealant through the seal cap.

13. A protected fastener construction comprising:
    q) a fastener;
    r) a seal cap which defines an interior; and
    s) a cured sealant;
    wherein the seal cap comprises a material having a dielectric breakdown strength of greater than 30.0 kV/mm, and wherein the seal cap has an average wall thickness of less than 0.5 mm;
    wherein the seal cap is positioned over the fastener such that at least a portion of the fastener resides in the interior of the seal cap; and
    wherein the interior of the seal cap additionally contains the cured sealant which binds the seal cap to the fastener.

14. The protected fastener construction according to claim 13 wherein the seal cap is translucent.

15. The protected fastener construction according to claim 13 wherein the seal cap is visibly transparent.

16. The protected fastener construction according to claim 13 wherein the seal cap comprises a material having a dielectric breakdown strength of greater than 40.0 kV/mm.

17. The protected fastener construction according to claim 13 wherein the seal cap comprises a material having a dielectric breakdown strength of greater than 50.0 kV/mm.

18. The protected fastener construction according to claim 13 wherein the seal cap comprises a fluorinated thermoplastic polymer.

19. The protected fastener construction according to claim 13 wherein the seal cap comprises a fluorinated thermoset polymer.

20. The protected fastener construction according to claim 13 wherein the seal cap comprises an engineering thermoplastic.

21. The protected fastener construction according to claim 13 wherein the seal cap comprises a THV polymer.

22. An application-ready seal cap comprising:
   v) a seal cap which defines an interior; and
   w) a quantity of an uncured sealant;
   wherein the seal cap comprises a material having a dielectric breakdown strength of greater than 30.0 kV/mm, and wherein the seal cap has an average wall thickness of less than 0.5 mm; and wherein the interior of the seal cap contains the quantity of uncured sealant.

23. The application-ready seal cap according to claim 22 wherein the seal cap is translucent.

24. The application-ready seal cap according to claim 22 wherein the seal cap is optically transparent.

25. The application-ready seal cap according to claim 22 wherein the seal cap comprises a material having a dielectric breakdown strength of greater than 40.0 kV/mm.

26. The application-ready seal cap according to claim 22 wherein the seal cap comprises a material having a dielectric breakdown strength of greater than 50.0 kV/mm.

27. The application-ready seal cap according to claim 22 wherein the seal cap comprises a fluorinated thermoplastic polymer.

28. The application-ready seal cap according to claim 22 wherein the seal cap comprises a fluorinated thermoset polymer.

29. The application-ready seal cap according to claim 22 wherein the seal cap comprises an engineering thermoplastic.

30. The application-ready seal cap according to claim 22 wherein the seal cap comprises a THV polymer.

31. A seal cap for protection of a fastener comprising a material having a dielectric breakdown strength of greater than 30.0 kV/mm having an average wall thickness of less than 0.5 mm.

32. The seal cap according to claim 31 which is translucent.

33. The seal cap according to claim 31 which is optically transparent.

34. The seal cap according to claim 31 which comprises a material having a dielectric breakdown strength of greater than 40.0 kV/mm.

35. The seal cap according to claim 31 which comprises a material having a dielectric breakdown strength of greater than 50.0 kV/mm.

36. The seal cap according to claim 31 comprising a fluorinated thermoplastic polymer.

37. The seal cap according to claim 31 comprising a fluorinated thermoset polymer.

38. The seal cap according to claim 31 comprising an engineering thermoplastic.

39. The seal cap according to claim 31 comprising a PEEK polymer.

40. The seal cap according to claim 31 comprising a THV polymer.

41. A method of protecting a fastener comprising the steps of:
   a) providing a fastener;
   b) providing a seal cap which defines an interior, wherein the seal cap comprises a material having a dielectric breakdown strength of greater than 30.0 kV/mm, and wherein the seal cap has an average wall thickness of less than 1.5 mm;
   c) applying an uncured sealant to the interior of the seal cap or to the fastener or to both; and
   d) positioning the seal cap over the fastener such that at least a portion of the fastener resides in the interior of the seal cap;
   wherein the seal cap comprises a THV polymer.

42. A protected fastener construction comprising:
   q) a fastener;
   r) a seal cap which defines an interior; and
   s) a cured sealant;
   wherein the seal cap comprises a material having a dielectric breakdown strength of greater than 30.0 kV/mm;
   wherein the seal cap has an average wall thickness of less than 1.5 mm;
   wherein the seal cap is positioned over the fastener such that at least a portion of the fastener resides in the interior of the seal cap;
   wherein the interior of the seal cap additionally contains the cured sealant which binds the seal cap to the fastener; and
   wherein the seal cap comprises a THV polymer.

43. An application-ready seal cap comprising:
   v) a seal cap which defines an interior; and
   w) a quantity of an uncured sealant;
   wherein the seal cap comprises a material having a dielectric breakdown strength of greater than 30.0 kV/mm;
   wherein the seal cap has an average wall thickness of less than 1.5 mm;
   wherein the interior of the seal cap contains the quantity of uncured sealant; and
   wherein the seal cap comprises a THV polymer.

44. A seal cap for protection of a fastener comprising a material having a dielectric breakdown strength of greater than 30.0 kV/mm having an average wall thickness of less than 1.5 mm; the seal cap comprising a THV polymer.

* * * * *